INVENTOR.
ALBERT G. BODINE
BY
SOKOLSKI & WOHLGEMUTH
ATTORNEYS

United States Patent Office 3,504,756
Patented Apr. 7, 1970

3,504,756
METHOD FOR PROVIDING EFFICIENT SONIC COUPLING TO THE EARTH IN A SEISMIC SURVEY SYSTEM
Albert G. Bodine, 7877 Woodley Ave., Van Nuys, Calif. 91406
Filed Sept. 11, 1968, Ser. No. 759,110
Int. Cl. G01v 1/14
U.S. Cl. 181—.5
4 Claims

ABSTRACT OF THE DISCLOSURE

High-level sonic energy is mechanically generated by an orbiting-mass oscillator means and is coupled to an elongated rod member to cause longitudinal vibration of such rod member, with little or no transverse vibration thereof. The rod member has anchor means at one end thereof which is tightly driven into the ground by rotational drive which rotates the rod member about its longitudinal axis, such drive being facilitated by the longitudinal vibration energy imparted to the rod member. The longitudinal vibration energy, which is along an axis substantially normal to the torsional drive, while it facilitates the driving of the rod member does not interfere with the tightness of the coupling to the earth, thereby assuring efficient coupling of the sonic energy to the earthen material. The sonic energy passes into the ground and is reflected back by the strata to a receptor rod member coupled to the earth at a convenient distance therefrom, where such energy is appropriately detected by means of a transducer.

---

This invention relates to seismic surveying and more particularly to a method for efficiently coupling sonic energy to and from the earth in a seismic survey system.

In geophysical prospecting, a high-level sound wave is set off in the earth and the sonic wave reflected back by the geological strata received and analyzed, such analysis indicating the nature of such strata. In view of the high attenuation characteristics of most earthen material, very high levels of sonic energy are required to produce useful reflections for analysis. These end results are generally achieved in devices of the prior art by setting off an explosive charge.

In my Patent No. 2,745,507, and my application Ser. No. 588,031 filed Oct. 20, 1966, seismic survey systems are described which utilize orbiting-mass oscillators to generate the needed sonic energy which have distinct advantages over the prior art explosive charge systems. In these prior systems utilizing orbiting-mass oscillators to generate the sonic energy, this energy is typically coupled to the earth through a base plate and a heavy reactive weight such as a concrete slab. With this type of coupling system, the force and thus the energy that can be coupled to the earth is limited by the mass of the system, much of which is provided by the reactive weight and base plate. If the force is increased beyond a critical point, the coupling member will tend to jump off the ground, thereby lowering the coupling efficiency and introducing nonlinear indeterminate vibrational components into the sonic wave, which hampers the over-all operation of the system. In the prior art, techniques have been suggested for cementing or otherwise locking an elastic rod to the earth to provide efficient coupling of sonic energy thereto. These prior art techniques however are overly time consuming and generally require rehabilitation of the sites at which they have been used. This is particularly significant in view of the fact that in seismic surveying a good number of readings must be taken from different transmitting sites.

The method of this invention overcomes the aforementioned shortcomings of prior art seismic survey systems utilizing energy generated by orbiting-mass oscillators by providing means for firmly anchoring into the earth a rod through which the sonic energy is transmitted. The rod is sonically excited along its longitudinal axis in sonic energy bursts while it is rotated about its longitudinal axis to drive an anchor element at one end thereof into the earth, the seismic energy facilitating the driving action but in view of its normal relationship to the rotational drive, not acting to impair the locking action of the anchor element into the earth. The sonic energy is thus utilized for the dual functions of providing the seismic signal and aiding in the driving and coupling of the anchor element to the ground.

Figure 1:
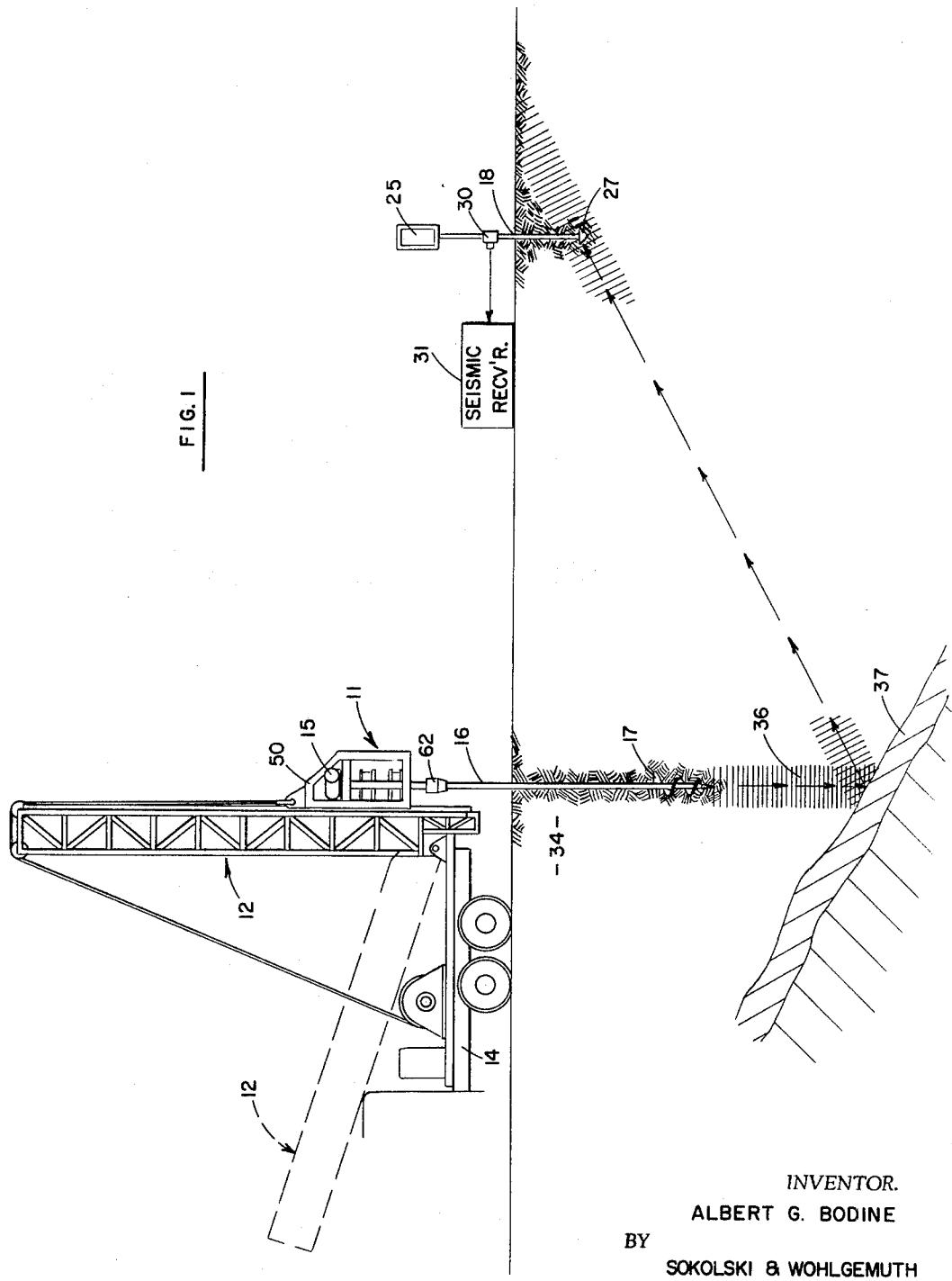
Figure 2:
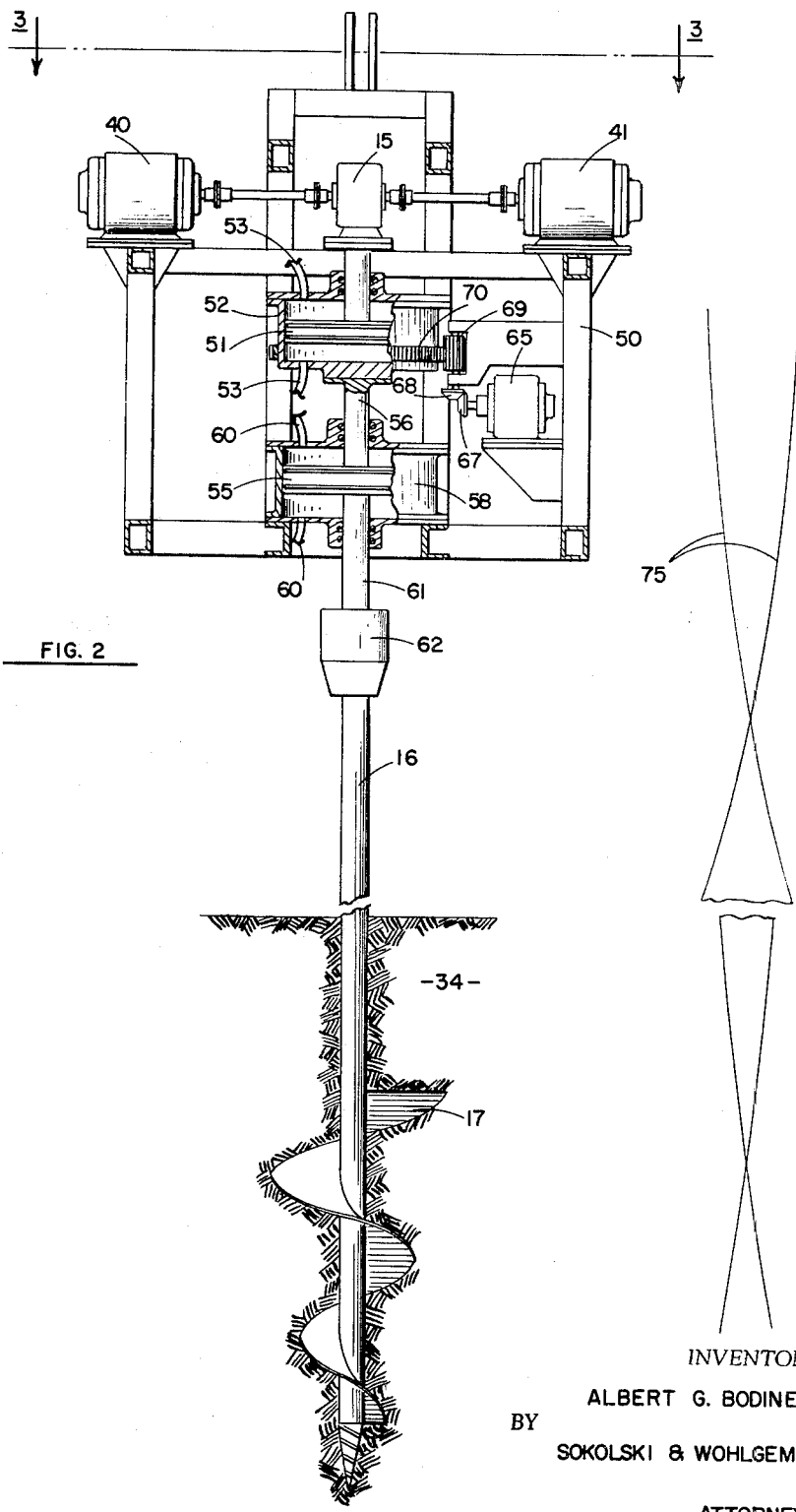
Figure 3:
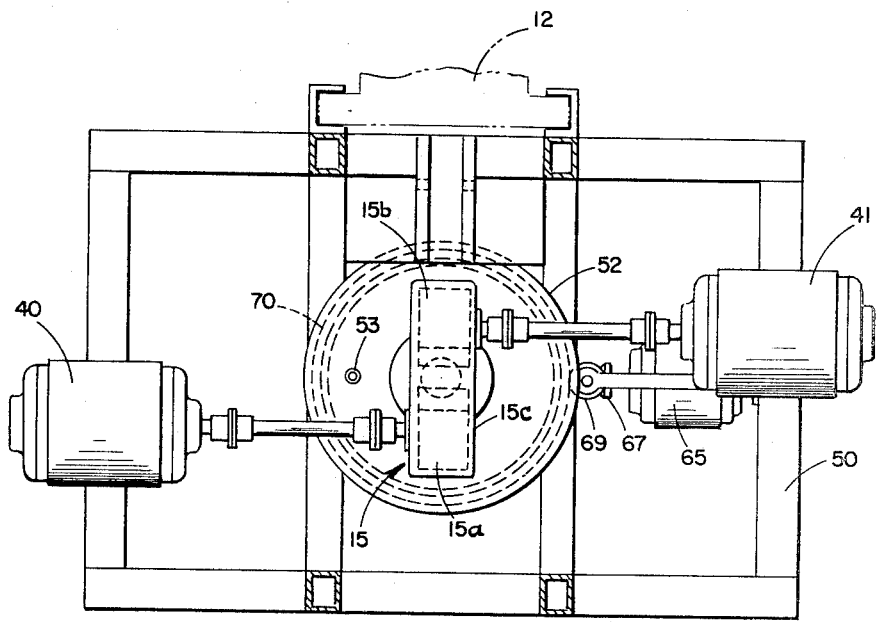
Figure 4:
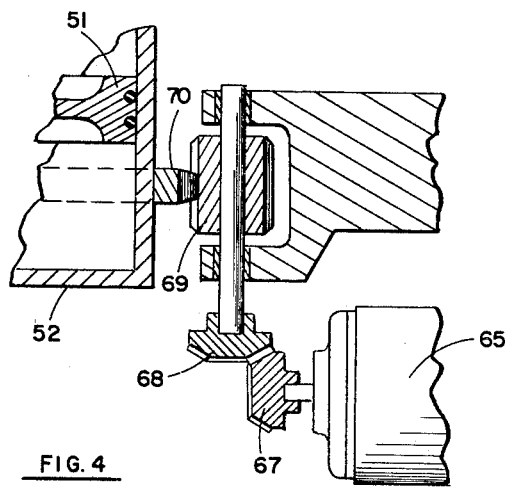

The method of the invention will now be described in connection with the accompanying drawings of which:
FIG. 1 is a schematic drawing illustrating the technique of the invention;
FIG. 2 is an elevational view in cross-section illustrating apparatus which may be utilized in carrying out the method of the invention;
FIG. 3 is a view taken along the plane indicated by 3—3 in FIG. 2; and
FIG. 4 is a view showing the details of the rotational drive of the device shown in FIG. 2.

Briefly described, the method of the invention is as follows: High-level sonic energy is generated by means of orbiting-mass oscillators and transmitted to a rod along the longitudinal axis thereof with transverse vibrational components being substantially eliminated. The rod has an anchor member at one end thereof, which is placed on the surface of the earth and driven therein by the simultaneous rotation of the rod about its longitudinal axis or by other lateral components of anchor plate drive, and the application of the bursts of sonic energy along such longitudinal axis. The anchor member may be in the form of a screw element which grips the earth, such gripping action not being impaired significantly by the longitudinal vibrational energy which is transmitted in a downward direction, substantially normal to the blades of the screw. A receiving rod member is implanted in the ground at a predetermined distance from the transmitting rod by means of an anchor member, such receiving rod having a geophone attached thereto for detecting the sonic waves transmitted into the ground and reflected back from the earth strata.

It has been found most helpful in analyzing the method of this invention to analogize the acoustically vibrating circuit utilized to an equivalent electrical circuit. This sort of approach to analysis is well known to those skilled in the art and is described, for example, in chapter 2 of "Sonics" by Hueter and Bolt, published in 1955 by John Wiley and Sons. In making such an analogy, force F is equated with electrical voltage E, velocity of vibration $u$ is equated with electrical current $i$, mechanical compliance $C_m$ is equated with electrical capacitance $C_e$, mass M is equated with electrical inductance L, mechanical resistance (friction) $R_m$ is equated with electrical resistance R and mechanical impedance $Z_m$ is equated with electrical impedance $Z_e$.

Thus, it can be shown that if a member is elastically vibrated by means of an acoustical sinusoidal force $F_0 \sin \omega t$ ($\omega$ being equal to $2\pi$ times the frequency of vibration), that $$Z_m = R_m + j\left(\omega M - \frac{1}{\omega C_m}\right) = \frac{F_0 \sin \omega t}{u} \quad (1)$$

Where $\omega M$ is equal to $1/\omega C_m$, a resonant condition exists, and the effective mechanical impedance $Z_m$ is equal to the mechanical resistance $R_m$, the reactive impedance components $\omega M$ and $1/\omega C_m$ cancelling each other out.

Under such a resonant condition, velocity of vibration $u$ is at a maximum, power factor is unity, and energy is more efficiently delivered to a load to which the resonant system may be coupled.

It is important to note the significance of the attainment of high acoustical Q in the resonant system being driven, to increase the efficiency of the vibration thereof and to provide a maximum amount of power for effectively surveying the geological strata. As for an equivalent electrical circuit, the Q of an acoustically vibrating circuit is defined as the sharpness of resonance thereof and is indicative of the ratio of the energy stored in each vibration cycle to the energy used in each such cycle. Q is mathematically equated to the ratio between $\omega M$ and $R_m$. Thus, the effective Q of the vibrating circuit can be maximized to make for highly efficient, high-amplitude vibration by minimizing the effect of friction in the circuit and/or maximizing the effect of mass in such circuit.

In considering the significance of the parameters described in connection with Equation 1, it should be kept in mind that the *total* effective resistance, mass, and compliance in the acoustically vibrating circuit are represented in the equation and that these parameters may be distributed throughout the system rather than being lumped in any one component or portion thereof.

It is also to be noted that orbiting-mass oscillators are utilized in the implementation of the invention that automatically adjust their output frequency and phase to maintain resonance with changes in the characteristics of the load. Thus, in the face of changes in the effective mass and compliance presented by the load with changes in the conditions of the work material as it is sonically excited, the system automatically is maintained in optimum resonant operation by virtue of the "lock-in" characteristic of applicant's unique orbiting-mass oscillators. Furthermore in this connection the orbiting-mass oscillator automatically changes not only its frequency but its phase angle and therefore its power factor with changes in the resistive impedance load, to assure optimum efficiency of operation at all times. The vibrational output from such orbiting-mass oscillators also tends to be constrained by the resonator to be generated along a controlled predetermined coherent path to provide maximum output along a desired axis.

Referring now to FIG. 1 a system which may be utilized in carrying out the method of the invention is schematically illustrated.

Seismic transmission device 11 is carried on hoist mechanism 12 which is supported on the back of vehicle 14. The seismic transmitter thus can be transported conveniently to and from the various sites at which seismic readings are to be taken. The seismic transmitter comprises orbiting-mass oscillator means 15 which is adapted to generate sonic energy and to transmit this energy to rod member 16. Substantially all of such energy is transmitted to rod member 16 along its longitudinal axis with little or no transverse vibrational components. Means are further provided, as to be explained fully further on in the specification, for rotating rod member 16 about its longitudinal axis to drive it into the ground. Rod member 16 has anchor means 17 which may be in the form of a screw or other suitable anchoring member having blades or the like which extend at a substantial angle from the longitudinal axis of rod member 16.

In taking a seismic reading, a receiving rod 18 is first anchored in the ground by driving an anchor head 21 attached to one end thereof into the earth. Such driving may be accomplished by utilizing sonic techniques as described, for example, in my Patent No. 3,352,369, issued Nov. 14, 1967. For optimum operation, anchor head 21 should be firmly attached to the ground with the sides of rod member 18 being relatively free from the surrounding earthen material so that the sonic energy received can be efficiently transmitted to geophone 30. Rod member 18 is terminated by a "dummy" load member 25, which may comprise a container filled with viscous fluid, or the like, having a resistive or dissipative impedance near enough to the characteristic impedance of rod 18 so as to comprise an "infinite" acoustic termination. Dummy load 25 thus provides an infinite termination for the rod and thus avoids the development of reflected signals which might distort the received information signal. Rod member 18 has a geophone 30 attached thereto for transducing the received vibratory signals to electrical form, the output of geophone 30 being fed to seismic receiver 31 where the information is appropriately processed for analysis.

Seismic readings are taken in the following manner: Receiving rod 18 is first installed in position as already described. The transmitter unit 11 is then transported to the desired transmission site by means of vehicle 14 and its anchor member 17 lowered to the surface of the ground 34 gravity-biased thereagainst. Bursts of high-level sonic energy are then transmitted to rod member 16 along the longitudinal axis thereof from oscillator 15 while rod member 16 is simultaneously rotated about its longitudinal axis by means of rotor drive means, as to be explained more fully in connection with FIGS. 2–4. Sonic energy transmitted to rod member 16 performes the dual function of facilitating the rotational drive of anchor member 17 into the ground, by fluidizing the earth, and providing a seismic wave 36 which strikes against the rock strata 37 and is reflected thereby and transmitted through the ground to anchor member 21 from whence it is coupled to rod 18. It is noted that the sonic energy in rod member 16 is along an axis substantially normal to the direction in which the blades of anchor member 17 extend. Thus, this energy does not act to loosen the coupling of the anchor member to the ground, assuring efficient coupling of such energy from the rod member to the earth at all times. It is to be noted that anchor member 17 is only one of many types of anchor members which may be used in practicing the method of the invention, the important criterion being that the locking means of such anchor members extends at a substantial angle to the longitudinal axis of the rod. Other such anchor members are described, for example, in my aforementioned Patent No. 3,352,369.

The transmission of the sonic seismic signal to rod 16 may produce satisfactory readings on seismic receiver 31 after the anchor member 17 has been driven just a short distance into the earth, or it may be necessary to drive the anchor 17 quite some distance into the ground until satisfactory readings can be obtained. At any rate, in view of the fact that seismic signals are continually being provided while the anchor is being driven into the ground, the sonic energy being simultaneously utilized to implement such driving action, the seismic readings can be expeditiously obtained, and can be discontinued at the earliest practicable time, i.e. just as soon as the desired information has been obtained, which in some instances may not require a very deep penetration. The various ramifications of taking geophysical surveys of the general type contemplated in this application, are described fully in my Patent No. 2,745,507, issued May 15, 1956.

Referring now to FIGS. 2–4, apparatus which may be utilized for the transmitter unit in carrying out the method of the invention is illustrated. The oscillator unit 15, as best shown in FIG. 3, may comprise cylindrical rotors 15a and 15b which are rotatably driven in orbiting paths around larger diameter cylindrical raceways formed in housing 15c by means of drive motors 40 and 41, respectively. The orbiting-mass oscillators may be of the general type described in connection with FIGS. 21 and 22 of my Patent No. 2,960,314, issued Nov. 15, 1960.

Rotors 15a and 15b are driven in opposite directions and are adjusted so that they are 180° out of phase with each other, so that transverse vibrational components generated by each cancel each other out, while longitudinal vibrational components (i.e. those in the direction of the longitudinal axis of rod 16) are additive. This type of operation is described, for example, in my Patent No. 3,354,968. Motors 40 and 41 are supported on frame support structure 50 which as shown in FIG. 1 is suspended from the hoist mechanism 12. The casing 15c of the oscillator (see FIG. 3) is supported on a piston member 51 which is contained within and mates with cylinder 52. Piston 51 is maintained approximately centered within its associated cylinder 52 by virtue of pneumatic pressurization provided to the opposite sides of the piston through pneumatic lines 53 from a pneumatic source (not shown).

Cylinder 52 is attached to and supported on piston 55 by means of shaft 56. Piston 55 is matingly contained within cylinder 58 and is kept substantially centered therein by means of pneumatic pressurization provided to the opposite sides of the piston through pneumatic lines 60. Cylinder 58 is supported on frame 50. Piston 55 is coupled through shaft 61 and chuck 62 to vibratory rod 16.

Cylinder 52 and its associated piston member 51 form pneumatic acoustic capacitance which is connected between oscillator 15 and vibratory rod 16 and acts to provide an impedance transformation between the relatively low impedance output of the oscillator and the high impedance coupling between anchor member 17 and the ground. The use of such a pneumatic spring to obtain an acoustic impedance transformation is described in my copending application No. 592,529, filed Nov. 7, 1966, and my Patent No. 3,352,369, issued Nov. 15, 1967. Cylinder 58 and its associated piston 55 form a compliant isolator of low impedance, to reduce resonant energy being bled off into the support structure 50.

The piston-cylinder construction utilized in this pneumatic capacitance 58–55 also facilitates the rotatable driving of rod member 16. Such rotatable drive is implemented by means of motor 65 which rotatably drives cylinder 52 and along with it rod 16. Such rotatable drive is achieved through the gear train between the motor and the cylinder which includes gears 69–70, gear 70 being attached to the outside wall of cylinder 52. Oscillator 15 is driven at a frequency such as to cause resonant elastic vibration, along the longitudinal axis of rod member 16, along with the total vibration system including the rod member, the pneumatic spring members, and the other structural members coupling the oscillator to the rod member, such resonant excitation resulting in high-level standing wave vibration as indicated by graph lines 75. Oscillator 15, as already noted, is excited in bursts, such action being controlled by appropriately energizing motors 40 and 41 for the predetermined energization periods.

The technique of this invention thus facilitates and expedites the taking of successive seismic readings by enabling the rapid and effective coupling of sonic energy into the earth from a sonic energy source, the sonic seismic energy being delivered along the longitudinal axis of a resonant vibratory rod member while said rod member is simultaneously coupled tightly to the ground through an anchor element, which is anchored such as by being rotatably driven about the longitudinal axis of the rod member.

I claim:
1. A method of seismic prospecting comprising the steps of:
   placing a rod member having an anchor element at one end thereof on the surface of the ground;
   generating sonic energy with an orbiting-mass oscillator device;
   coupling said sonic energy in longitudinal elastic tension and compression vibrations along the longitudinal axis of said rod, there being insignificant vibration of said rod traverse to said longitudinal axis;
   simultaneously rotating said rod about its longitudinal axis to drive said anchor into the ground; and
   receiving reflections of energy from the earthen strata in a second rod member spaced from said first rod member, said second rod member having an acoustical detector for detecting the received signals.

2. The method of claim 1 wherein said longitudinal vibrational energy is transmitted to said first rod only while said rod is being rotatably driven into the earth.

3. The method of claim 1 wherein the sonic energy is transmitted to said rod member after said rod member has been fully rotated into its penetration position.

4. The method of claim 1 wherein the anchor element of said first rod member comprises a screw member having spiral blades which extend substantially normally from the longitudinal axis of said first rod member, the vibration energy being transmitted substantially normally from the blades of said screw member into the earth.

References Cited
UNITED STATES PATENTS

| | | | |
|---|---|---|---|
| 2,806,533 | 9/1957 | Fleck | 181—0.5 |
| 3,034,595 | 5/1962 | Thompson | 181—0.5 |
| 3,164,799 | 1/1965 | Minasian | 340—17 |
| 3,274,544 | 9/1966 | McCollum | 340—15.5 |

RODNEY D. BENNETT, Jr., Primary Examiner

C. E. WANDS, Assistant Examiner